United States Patent [19]

Otani

[11] 3,916,851

[45] Nov. 4, 1975

[54] TWO-CYCLE INTERNAL COMBUSTION ENGINE

[75] Inventor: Junji Otani, Omiya, Japan

[73] Assignee: Honda Giken Kogyo Kabushiki Kaisha, Tokyo, Japan

[22] Filed: Nov. 29, 1973

[21] Appl. No.: 420,227

[30] Foreign Application Priority Data
Dec. 8, 1972  Japan.............................. 47-122434

[52] U.S. Cl.......... 123/73 A; 123/32 ST; 123/73 R; 123/75 B; 123/191 SP; 123/DIG. 4
[51] Int. Cl.$^2$........................................ F02B 33/04
[58] Field of Search...... 123/32 SPA, 32 SP, 73 PP, 123/DIG. 4, 73SP, 73A, 191 S, 191 SP, 123/73 B, 73 BA, 32 ST, 75 B, 65 A

[56] References Cited
UNITED STATES PATENTS

| | | | |
|---|---|---|---|
| 1,001,404 | 8/1911 | Holloway.......................... | 123/73 SP |
| 1,483,619 | 2/1924 | Smith................................. | 123/73 B |
| 1,808,384 | 6/1931 | Taneyhill........................... | 123/32 ST |
| 2,156,665 | 5/1939 | Mallory............................. | 123/32 SPA |
| 2,735,413 | 2/1956 | Meyer et al....................... | 123/32 ST |
| 2,758,576 | 8/1956 | Schlamann........................ | 123/32 SP |
| 3,107,659 | 10/1963 | Steinlein et al................... | 123/73 V |
| 3,363,611 | 1/1968 | Von Seggern et al........... | 123/32 SPA |

FOREIGN PATENTS OR APPLICATIONS

| | | | |
|---|---|---|---|
| 852,780 | 10/1952 | Germany......................... | 123/73 AA |
| 84,680 | 5/1956 | Netherlands..................... | 123/32 SPA |
| 660,108 | 3/1938 | Germany.......................... | 123/73 A |
| 749,456 | 11/1944 | Germany......................... | 123/DIG. 4 |

*Primary Examiner*—Wendell E. Burns
*Assistant Examiner*—David D. Reynolds
*Attorney, Agent, or Firm*—Lyon & Lyon

[57] ABSTRACT

In a two-cycle internal combustion engine having a main combustion chamber and a pressurized crank case joined by a main scavenging passage and a main intake passage to the crank case from a main carburetor, the addition of an auxiliary combustion chamber connected to the crank case by an auxiliary scavenging passage through a pressure receiving chamber. An auxiliary intake passage is connected to the auxiliary scavenging passage between the crank case and the auxiliary chamber, and a check valve is situated in the auxiliary scavenging passage intermediate the intake passage and the auxiliary combustion chamber. An auxiliary carburetor supplies a relatively rich mixture to the auxiliary combustion chamber while the main carburetor supplies a lean mixture to the main combustion chamber whereby ignition of the mixture in the auxiliary chamber produces a blast of flame into the main chamber through a passage called a torch nozzle to ignite the mixture in the main chamber thereby achieving a more complete and consistent combustion in the main chamber.

6 Claims, 2 Drawing Figures

TWO-CYCLE INTERNAL COMBUSTION ENGINE

BACKGROUND OF THE INVENTION

The present invention relates generally to twocycle internal combustion engines of the type having a pressurized crank case which receives the intake mixture and during the power stroke the mixture within the crank case is compressed and thereafter supplied through a scavenging passage into the combustion chamber. Conventional two-cycle engines have the disadvantage that at low speeds, there is not adequate scavenging of the combustion chamber to remove a sufficient amount of the residual burned gases and therefore the supply of fresh mixture to the combustion chamber frequently gives a mixture which will not be readily ignited by a spark plug until there have been several additional cycles which will adequately scavenge the burned gases from the combustion chamber. The result is at low speeds or under low load conditions that the engine ignites in an irregular fashion. The irregular combustion within the combustion chamber is undesirable since it results in uneconomical fuel usage, but there is also a substantial quantity of unburned gases in the exhaust emissions and such unburned gases are a source of air pollution.

SUMMARY OF THE INVENTION

The present invention provides an improvement to solve the aforementioned disadvantage of the common two-cycle engines and which produces a two-cycle engine which is substantially free of irregular ignition over a wide range of engine operating conditions. This obtainment of more regular combustion within the engine makes possible the use of a relatively lean fuel mixture which by the elements of the present invention can be readily ignited thereby enhancing fuel economy while at the same time reducing air pollution.

The foregoing improvement in performance for two-cycle engines is accomplished in the present invention by adding to conventional engines an auxiliary combustion chamber adjacent the main combustion chamber and delivering to that combustion chamber a relatively rich fuel mixture. This mixture is ignited by a spark plug situated in the auxiliary combustion chamber and the auxiliary chamber communicates with the main chamber by means of a passage called a torch nozzle. When the rich mixture ignites, a blast of flame issues through the torch nozzle into the main chamber and this blast of flame readily ignites the lean mixture in the main combustion chamber, much more efficiently than does the spark of a conventional engine. The manner in which the rich mixture is delivered to the auxiliary combustion chamber at the same time that the lean mixture is delivered to the main cumbustion chamber as well as the details of construction of the present invention will become clear upon reading the ensuing detailed description of the preferred embodiment.

DESCRIPTION OF THE PREFERRED EMBODIMENT

Figure 1:
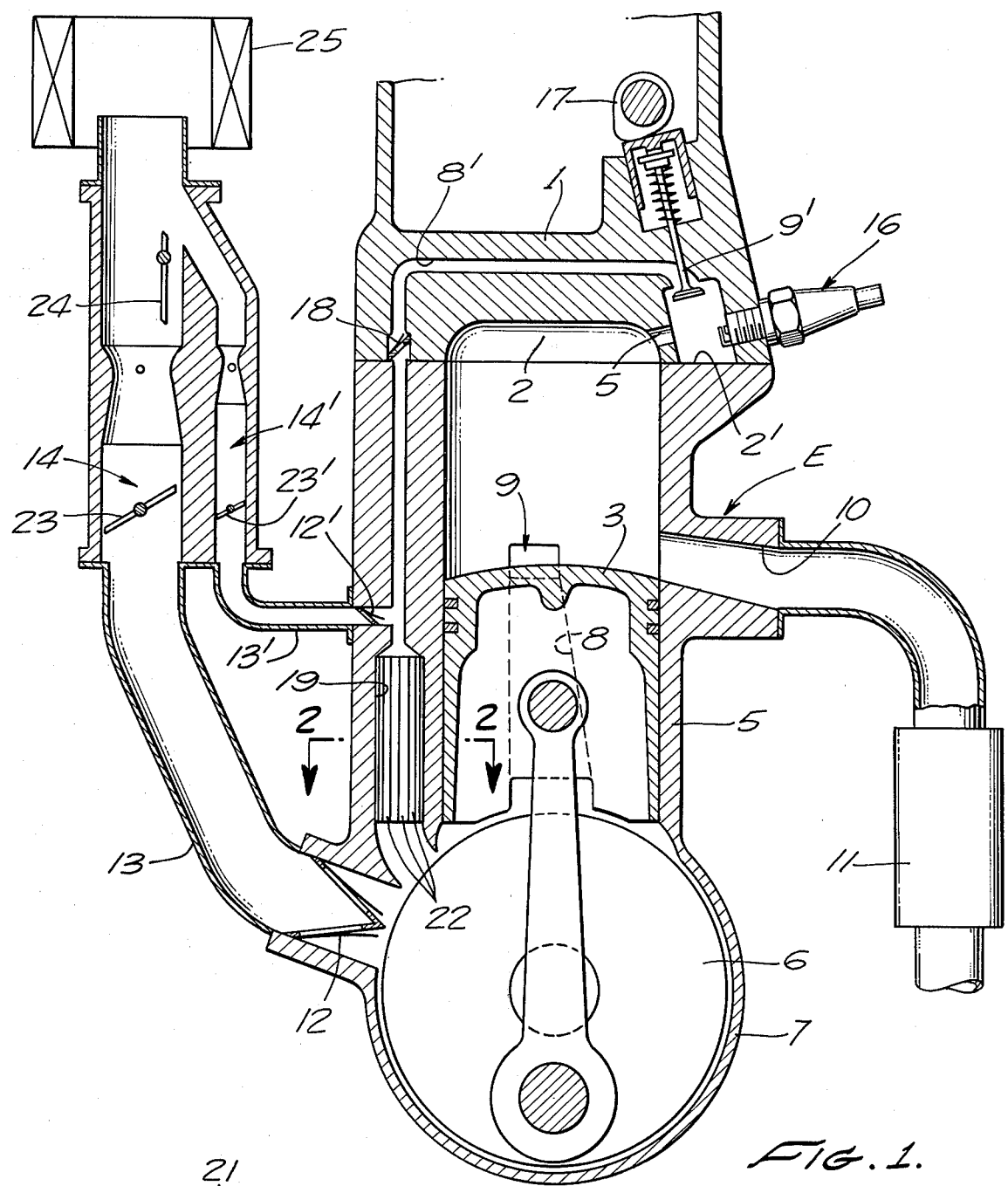
FIG. 1 is a vertical sectional view of a two-cycle engine made in accordance with the present invention.

In the drawings, an engine E comprises a cylinder head 1 having a main combustion chamber 2, a cylinder block 5 having a cylinder 4 in which is situated a piston 3. In the lower portion of the cylinder block 5 is a crankcase 7 having a crankshaft 6 therein in the usual manner. In the cylinder block there is a main scavenging passage 8 communicating between the crankcase 7 and the cylinder 4, providing at its upper end an opening which forms the main intake valve 9. It will be noted that the opening to the main intake valve 9 is controlled by the position of the piston 3 such that scavenging passage 8 is placed in communication with the crank case 7 when the piston 3 nears its downwardmost position, during which time the exhaust passage 10 is also made to open so that burned gases from a prior combustion exit through the exhaust passage 10 and pass through the exhaust conditioning equipment 11. The interior of cylinder 4 is scavenged by the injection of the fuel mixture from the crankcase 7 which issues through passage 8 into cylinder 4 when the intake valve 9 is opened. The main intake passage 13 is connected to the cylinder block 5 and communicates with the interior of the crankcase 7 through a main intake valve 12 which is of the check valve type. The other end of main intake passage 13 is connected to the main carburetor 14. The main carburetor 14 has a throttle valve 23, a choke valve 24 and an air cleaner 25. The details of the engine thus far described are conventional.

Figure 2:
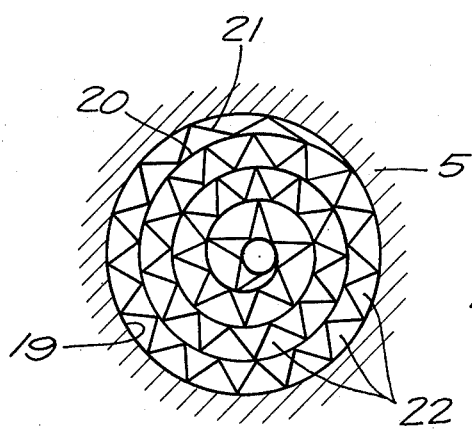
FIG. 2 is a sectional detail view taken along line 2—2 of FIG. 1.

The cylinder head 1 is provided with an auxiliary combustion chamber 2' which communicates with the main combustion chamber 2 through a passage called a torch nozzle 15. The spark plug 16, rather than having its electrode projecting into the main combustion chamber 2, is situated in the auxiliary chamber 2'. An auxiliary scavenging passage 8' extends through the head 1 and connects at one end to the auxiliary chamber 2'. An auxiliary intake valve 9' is provided where the passage 8' joins the chamber 2'. Valve 9' is actuated by a cam 17 driven by the crankshaft 6 and is made to open during scavenging strokes of the engine. A check valve 12' is provided in passage 8' to restrict backflow in that passage for reasons which will be more clearly explained subsequently. In the cylinder block 5, the auxiliary scavenging passage 8' extends to the crank case 7 through a pressure receiving chamber 19 which is of enlarged cross-sectional diameter, the volume of which is greater than the volume of the auxiliary combustion chamber 2'. Between the pressure receiving chamber 19 and the the check valve 12 an auxiliary intake passage 13' couples to passage 8' through an auxiliary intake check valve 12'. Intake passage 13' is coupled to an auxiliary carburetor 14' having a throttle valve 23'. The main and auxiliary carburetor 14 and 14' are formed as an integral unit and are so designed that the main carburetor 14 produces a relatively lean fuel-air mixture while the auxiliary carburetor can produce a relatively rich mixture. The pressure receiving chamber 19 is divided into a multitude of small passages 22 formed by means of a plain sheet 20 and a corrugated sheet 22 placed adjacent one another and rolled into a spiral configuration, as may best be seen in FIG. 2. The function of this multitude of small passages 22 will be explained subsequently.

During the operation of the engine, on the compression stroke the piston 3 moves upwardly, and the pressure in the crankcase 7 and in the pressure receiving chamber 19 is decreased, introducing into the crankcase 7 through the main intake passage 13 the relatively lean mixture produced by the main carburetor 14. At the same time, the decreasing pressure within the crankcase 7 causes the relatively rich mixture produced by the auxiliary carburetor 14' to be introduced through intake passage 13' into chamber 19, past check valve 12'. Because of the increased volume of the chamber 19 and the flow resistance present in the intake passage 13', as well as the limited quantity of rich mixture produced by auxiliary carburetor 14', the mixture flows into chamber 19 and into the plurality of passages 22 but does not flow all the way into crankcase 7. In fact, due to the relatively large volume of mixture coming into the crankcase through the main passage 13, some of that lean mixture will enter into and occupy the lower portion of the chamber 19. The separating plates 20 and 21 which define the small passages 22 will at this point aid in keeping the mixtures separate so that they do not become mixed to any substantial degree.

Upon combustion whereupon the piston 3 commences to move downwardly, the piston operates to compress the mixture in the crankcase and as the piston reaches a lower position, the main intake valve 9 is opened as is the exhaust passage 10 and the compressed mixture from the crankcase issues into the cylinder 4 through the scavenging passage 8 thereby forcing out the burned gas from the previous combustion through the exhaust passage 10. At the same time, the compression pressure in the crankcase acts upon chamber 19 and the auxiliary intake valve 9' is caused to open whereupon the rich mixture stored in chamber 19 is forced into the auxiliary combustion chamber 2' passing through check valve 18 so that the residual burned gases in the auxiliary combustion chamber 2' are forced out into the cylinder 4 through the torch nozzle 15.

Under conditions where the engine is under low load and therefore the scavenging effects are not sufficient to remove most of the burned gases, there are times when a fresh charge of mixture has been introduced into both the main and auxiliary combustion chambers and yet the main and auxiliary intake valves 9 and 9' are still open. In such a case, back pressure from the pulsating waves in the exhaust gases generated in the exhaust passage 10 may tend to force some of the lean mixture within cylinder 4 into the auxiliary combustion chamber 2' and would thereby tend to force the rich mixture out of the combustion chamber 2' back through the scavenging passage 8' but here the check valve 18 is effective to prevent this from happening so that the desired rich mixture in the auxiliary chamber will not be excessively diluted with the lean mixture from the main chamber. As the piston 3 begins to move upwardly again and the main valve 9 is closed, so also is the auxiliary valve 9' closed and as the piston reaches top dead center, the spark plug 16 is actuated igniting the mixture in the auxiliary chamber and the flame of combustion is injected through the torch nozzle 15 into the main chamber 2. A wide cone of flame injected into the main chamber causes the relatively lean mixture therein to ignite and does so more readily than the ignition spark in conventional engines.

Accordingly, by the improvement of the present invention, a lean mixture may be introduced into the main combustion chamber and is ignited not by the spark from the spark plug but by a flame produced from igniting the rich mixture in the auxiliary chamber so that even though the lean mixture in the main combustion chamber may be diluted by residual burned gases from the previous cycle which have not been adequately scavenged from the chamber, a condition which commonly occurs at low speeds, the mixture in the main chamber is more readily ignited at low speeds so that the irregular combustion inherent in conventional two-cycle engines will be eliminated. This beneficial result in the function of the engine is accompanied by an additional advantage in that the present invention makes it possible to use a leaner mixture in the main combustion chamber, at the same time making possible a substantial reduction in the quantity of unburned gases in the exhaust emissions. Thus, the present invention makes possible increased fuel economy for two-cycle engines while at the same time reducing the air pollution caused thereby. The check valve 18 restricts backflow of gas in the scavenging passage 8' so that even at low speeds the pulsating back pressure of the exhaust gases will not scavenge the rich mixture from within the auxliary combustion chamber so that it can be assured that the auxiliary combustion chamber will always be supplied with a rich mixture ready for ignition at the proper time. Another benefit from the use of check valve 18 to prevent backflow scavenging of the auxiliary chamber, is that one can increase the size of the auxiliary intake valve 9' over that which would otherwise be possible so that the auxiliary charge more readily scavenges the interior of the auxiliary chamber 2' to remove the burned gases even during operation at low speeds or under low load conditions where the quantity of fuel mixture supplied is relatively small.

While particular objects and advantages of the present invention have been shown and described herein, it will be readily apparent to those skilled in the art that other changes or modifications might be made without departing from this invention in its concept and it is understood that this invention shall be limited by the lawful scope of the appended claims.

I claim:

1. In a two-cycle internal combustion engine of the type having a main combustion chamber and a crankcase, a main scavenging passage between the crankcase and the main combustion chamber and a main intake passage coupled between the crankcase and a carburetor for supplying fuel-air mixture thereto, the improvement comprising:

an auxiliary combustion chamber, a torch nozzle connecting said auxiliary combustion chamber to said main combustion chamber, a spark plug in communication with said auxiliary combustion chamber, auxiliary carburetor means for producing an auxiliary fuel mixture, and passage means connected to said auxiliary carburetor means and said auxiliary combustion chamber for conducting said auxiliary fuel mixture to said auxiliary combustion chamber, said auxiliary passage means including an auxiliary scavenging passage having one end thereof joining the inlet of said auxiliary combustion chamber, first valve means situated at the inlet to said auxiliary combustion chamber, means coupled to said first valve means for opening and closing the same, and a pressure receiving chamber, one end of which is in open communication with said crankcase, said auxiliary scavenging passage having its other end connected to the other end of said receiving chamber.

2. The combination set forth in claim 1 wherein said pressure receiving chamber comprises a cylindrical chamber the diameter of which is greater than the diameter of said auxiliary scavenging passage, a plurality of separator plates disposed within said chamber, said plates defining a plurality of longitudinal passages oriented in the same direction as the major axis of said chamber.

3. The combination set forth in claim 2 wherein the volume of said pressure receiving chamber is greater than the volume of said auxiliary combustion chamber.

4. The combination set forth in claim 1 wherein said auxiliary passage means further includes:
an auxiliary intake passage coupled at one end to said auxiliary carburetor means, the other end of auxiliary intake passage being coupled to said auxiliary scavenginig passage intermediate the ends thereof and near said pressure receiving chamber.

5. The combination set forth in claim 4 further including check valve means situated in said main intake passage and said auxiliary intake passage.

6. The combination set forth in claim 4 further including check valve means situated in said auxiliary scavenging passage intermediate said auxiliary combustion chamber and said auxiliary intake passage.

* * * * *